Feb. 17, 1948. J. S. CARDILLO 2,436,248
COUPLING
Filed Feb. 1, 1945 2 Sheets-Sheet 1

INVENTOR.
Joseph S. Cardillo

Feb. 17, 1948. J. S. CARDILLO 2,436,248
COUPLING
Filed Feb. 1, 1945 2 Sheets-Sheet 2

INVENTOR.
Joseph S Cardillo
BY
ATTYS

Patented Feb. 17, 1948

2,436,248

UNITED STATES PATENT OFFICE 2,436,248

COUPLING

Joseph S. Cardillo, Elyria, Ohio, assignor to Romec Pump Company, Elyria, Ohio, a corporation of Ohio Application February 1, 1945, Serial No. 575,709

3 Claims. (Cl. 64—27)

This invention relates to couplings and particularly to couplings adapted to absorb torsional vibration.

Particularly in the driving of instrumentalities by or from internal combustion engines it has been found that the inherent torsional vibration of the driving shaft has deleterious effects upon driven instrumentalities. My purpose is to provide a coupling which has high torque characteristics in either direction of rotation, is compact in size, is economical of manufacturing cost and is foolproof and durable in that even an injury to one of the spring parts thereof will not interrupt the transmission of torque albeit the impairment of the vibration absorbing characteristic may in part result.

Figure 1:
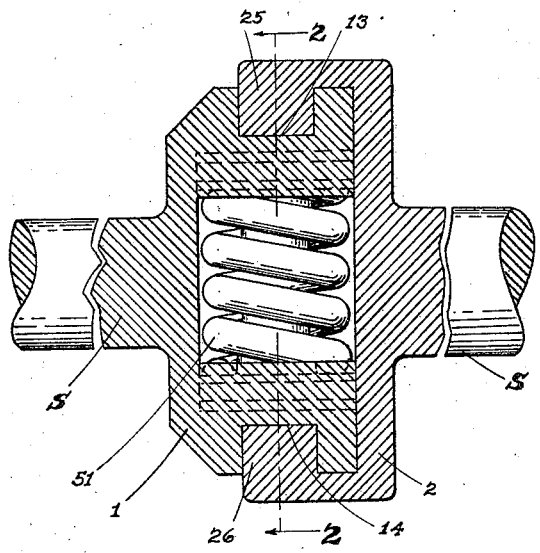
Figures 2, 3:
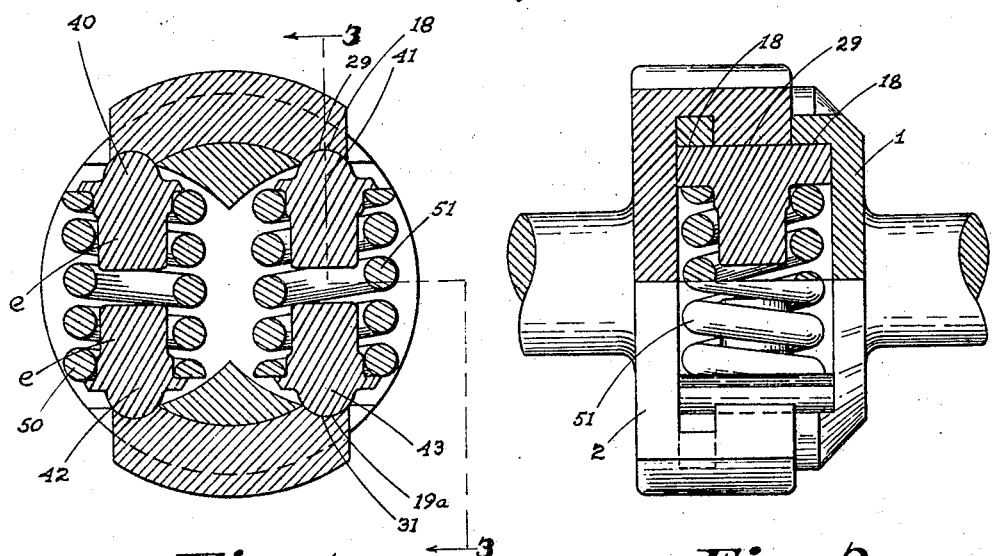
Figure 4:
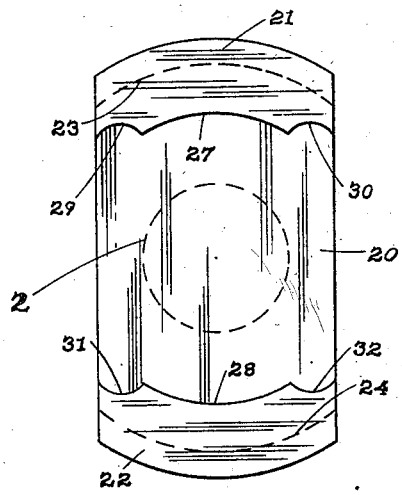
Figure 5:
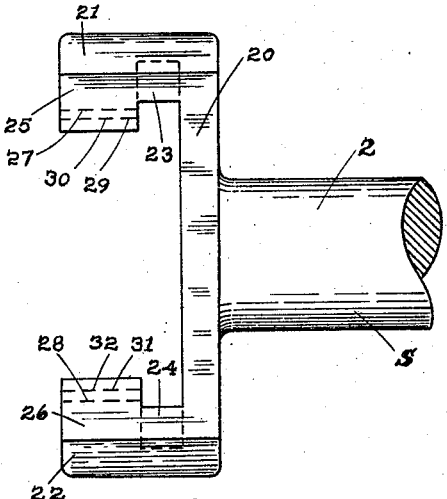
Figure 6:
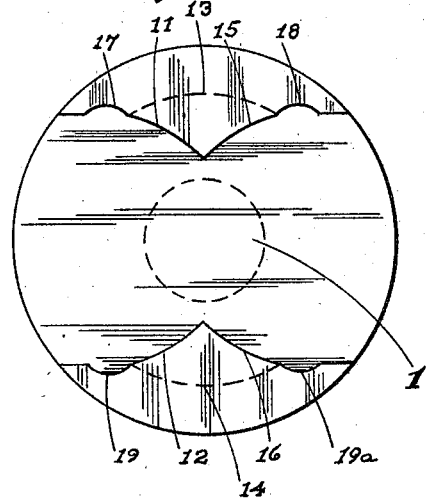

Other objects will appear from the following description of a preferred form of my invention reference being had to the accompanying drawings in which Figure 1 is a longitudinal sectional view of the parts comprising my coupling; Figure 2 is a transverse section taken along the line 2—2 of Figure 1; Figure 3 is a broken section taken along the broken line 3—3 of Figure 2; Figure 4 is an end elevation of one of the coupling members; Figure 5 is a side elevation of the same coupling member; Figure 6 is an end elevation of the other coupling member, and Figure 7 is a side elevation of said other coupling member.

In the preferred form of my invention illustrated in the drawings either of the two main coupling members 1 and/or 2 may be the driving or driven member depending on the direction in which the coupling is related to the driving instrumentality. For convenience I shall refer to the driving member as the member 2 and the driven member as the member 1, it being understood that the position and direction of drive may be reversed when desired. Both the driving and driven members are shown to have conventional shaft parts S which may take any desired or convenient form, and which per se are not part of my invention. The driving member 2, see Figs. 4 and 5, comprises in addition to the shaft S an integral plate or disc-like portion 20 on diametrically opposite parts of which are disposed integral head portions 21 and 22 which may be of identical form and which head portions each have an undercut arcuate groove 23 and 24. The grooves 23 and 24 are formed between the face of plate or disc 20 and inwardly extending lips or jaws 25 and 26 respectively which extend radially inwardly of the head and define with the plate 20 the respective grooves 23 and 24. The radial inward face or surface of each of the jaws 25 and 26 comprises a central and long arcuate surface, 27 on the lug or jaw 25, and 28 on the lug or jaw 26, see Figure 4. Adjacent to and at the respective ends of the arcuate surfaces 27 and 28 are smaller arcuate surfaces or seats, 29 and 30 adjacent the surface 27, and 31 and 32 adjacent the ends of the surface 28.

Figure 7:
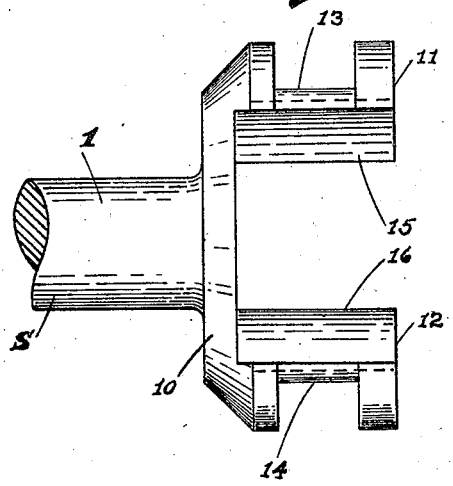

The driven member 1, see Figures 6 and 7, is constructed to be complementary to the driving member 2 and as will more fully appear is arranged to interfit with the driving member somewhat in the manner of a bayonet lock whereby to be detachable therefrom in one position but engageable therewith with freedom of circumferential motion but without substantial freedom of longitudinal or radial motion.

The driven member 1 comprises a disc-like portion 10 integrally formed with the shaft portion S. The disc portion 10 carries on opposite peripheral portions thereof axially extending lugs 11 and 12 which may be substantially identical in form and are diametrically oppositely disposed of the disc 10. Each of the lugs 11 and 12 have a central arcuate channel, 13 in the lug 11, and 14 in the lug 12. The channels 13 and 14 respectively are of width and depth to receive the jaws 26 and 25 respectively of the driving member 2 when the parts are engaged as shown for example in Figure 1. Each of the lugs 11 and 12 also comprise a radially inwardly extending and reenforcing part 15 and 16 which strengthen the lugs and underlie the bottom surface of the channels 13 and 14 respectively. Each of the lugs 11 and 12 have small inwardly facing axially spaced arcuate surfaces or seats, 17 and 18 in the lug 11, and 19 and 19a in the lug 12. These small arcuate surfaces 17, 18, 19 and 19a are so disposed in relation to the center of the driven member, and the center of the driving member when the parts are assembled, as to be longitudinally coextensive with and adjacent to the arcuate surfaces 29, 30, 31 and 32 in the driving member 20, and lie on opposite axial sides of the surfaces 29—32 respectively. This relationship of the small arcuate surfaces may be seen in greater clarity and detail in their assembled relation in Figures 2 and 3 of the drawings.

The head parts of the driving member and the lug parts of the driven member are so spaced diametrically of their respective members that when one of the members is turned at 90° from its position shown in Figures 4 to 7 and the other is retained in the position therein shown, that the lugs and heads of the respective members may be interfitted and upon being given a 90° turn will assume an interlocked relation shown in Figures 1 to 3 of the drawings. In this position, as above mentioned, the small arcuate surfaces 29 to 32 and 17 to 19a will have become axially aligned so as to define a continuous arcuate surface as shown in section in Figure 3.

When the driving and driven members are thus interengaged the additional parts of the coupling are assembled therewith. These parts comprise four spring seat members 40, 41, 42 and 43, see Fig. 2, the outwardly disposed arcuate surfaces of which smoothly engage the respective sets of seat surfaces 29 to 32 inclusive and 17 to 19a inclusive, the latter spanning the former axially whereby to prevent tipping or misalignment of the members 40—43 when any of the surfaces 17 to 19a or 29—32 are out of contact therewith. Between oppositely disposed pairs of these spring seats are disposed compressed springs 50 and 51, which springs urge the respective pairs of seats 40 and 42, and 41 and 43, oppositely away from each other and firmly into the respective groups of seat surfaces in which each of the seat members bear. Each of the seat members may and preferably does have an inwardly extending portion E, the innermost ends of adjacent pairs of which are spaced apart a little more or less as desired so that in the event of a failure of a spring these extensions E might bottom or might bottom before a failure of a spring to limit the compression thereof.

In operation it will be observed that when torque is transmitted from one member to the other that both of the springs 50 and 51 are simultaneously compressed since the oppositely disposed spring seat members such as 40 and 42 are both engaged by both the driving and driven members through the seat surfaces 17 to 19a and 29 to 32, so that any circumferential displacement between the driving and driven members causes the spring seat members to be moved toward each other, i. e. causes the member 40 and 42 to approach while at the same time causes the member 41 to approach the member 43. Thus torque is transmitted from the driving and driven members through both springs 50 and 51 at all times. It may be illustrative to say that if either spring were to fail the whole torque would be transmitted through the other spring regardless of the failure of the first spring.

As may perhaps be best seen in Figures 2 and 3 the springs with their respective seat members may be readily inserted and removed from their working position as by compressing the same with an appropriate tool whereby to bring the arcuate outwardly disposed surfaces of the members 40—43 within the coacting seating surfaces 17 to 19a and 29 to 32 as above mentioned. It will also be observed particularly from Figure 2 that both of these springs are acting in chords of the circle of the disc 10, and preferably are wholly contained within the peripheral outline of the disc 10. This leads to compactness, ready accessibility and replacement of the springs or the adjacent members and easy inspection and repair of the parts.

My invention provides a coupling in which high torque load and capacity is provided in a very simple and compact device. Both of the springs 50 and 51 share all of the loads imposed upon the coupling and are operative in damping shock loads and/or angular accelerations from either the driven or driving instrumentality in either direction of rotation.

While I have illustrated and described a preferred embodiment of my invention, alterations, changes and improvements will occur to those skilled in the art within the precepts and teachings hereof and I do not care to be limited to the preferred form of my invention as herein specifically illustrated or in any manner other than by the claims appended hereto.

I claim:

1. In a coupling having a driving member and a driven member the combination of diametrically oppositely disposed parts carried by the driving member and diametrically oppositely disposed parts carried by the driven member, said parts respectively having rib and channel portions interfitting to permit relative circumferential motion therebetween while preventing longitudinal motion therebetween, each of said parts having diametrically off-set and axially aligned seat portions, spring spaced members supported in said seat portions, and springs compressed therebetween whereby to resiliently resist any relative circumferential movement between said parts of said members, said parts when interfitted defining circumferentially open spaces therebetween into and from which said last named members and springs may be inserted and removed to and from said seats, said driving and driven members overlying the ends of said spring spaced members when the latter are seated in said seat portions.

2. In a coupling comprising axially aligned driving and driven members, the combination of head and lug parts interengaged and respectively carried by said members, each said lug and head parts having diametrically offset and axially aligned seats oppositely spaced on chords of the circle of which said members are axially aligned, springs disposed in the chords of said circles respectively, and means removably engageable with said seats and said springs and urged by said springs into the said seat portions of said lug and head parts whereby said means are urged toward each other upon any circumferential displacement between said lug and head parts, said lug and head parts when interengaged defining circumferentially open spaces therebetween into and from which said springs and said means may be inserted and removed radially to and from said seats, said members confining said means axially.

3. In a coupling the combination of a driving member having a disc like portion, a driven member having a disc like portion, the disc like portions of said members being coaxially disposed and oppositely facing, the disc like portion of one of said members having a pair of integrally formed diametrically oppositely disposed head parts overhanging and defining an inwardly facing channel adjacent said portion, the disc like portion of the other of said members having a pair of integrally formed diametrically oppositely disposed lug parts with inwardly extending reinforcing sections and with outwardly facing channelled sections the walls of which remote from said portion being formed complementarily of the channels overhung by said head parts and adapted to interfit therein, said head parts being adapted to fit into the channeled sections of said lug parts, each of said parts embracing substantially a quadrant of said portions whereby upon being interfitted together substantially quadrant-like circumferentially open spaces are provided between said portions, each said parts having arcuate seats disposed transversely of chords of axially spaced circles struck from the axis of alignment of said members, spring means aligned with said chords and disposed in said spaces and interposed between said seats, members borne upon by said spring means and engaged by said seats of each of said driving and driven members whereby to be displaced upon any relative circumferential movement between said driving and driven members, said spring means and said last named members being insertable and removable radially of said spaces to and from said seats.

JOSEPH S. CARDILLO.

REFERENCES CITED

The following references are of record in the file of this patent:

UNITED STATES PATENTS

| Number | Name | Date |
| --- | --- | --- |
| 1,192,731 | Batchelder | July 25, 1916 |
| 1,284,268 | Eaton | Nov. 12, 1918 |